Patented June 9, 1942

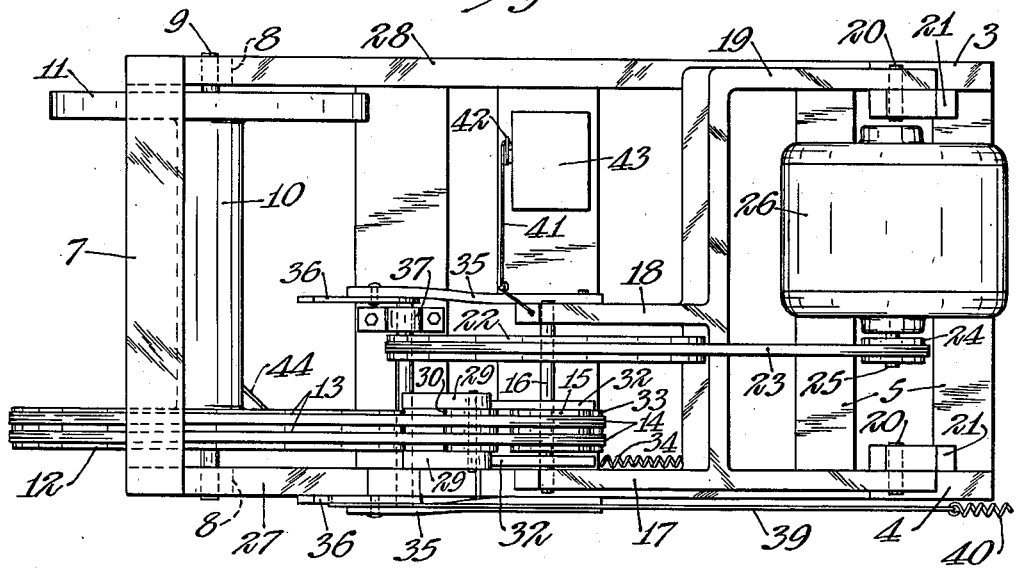
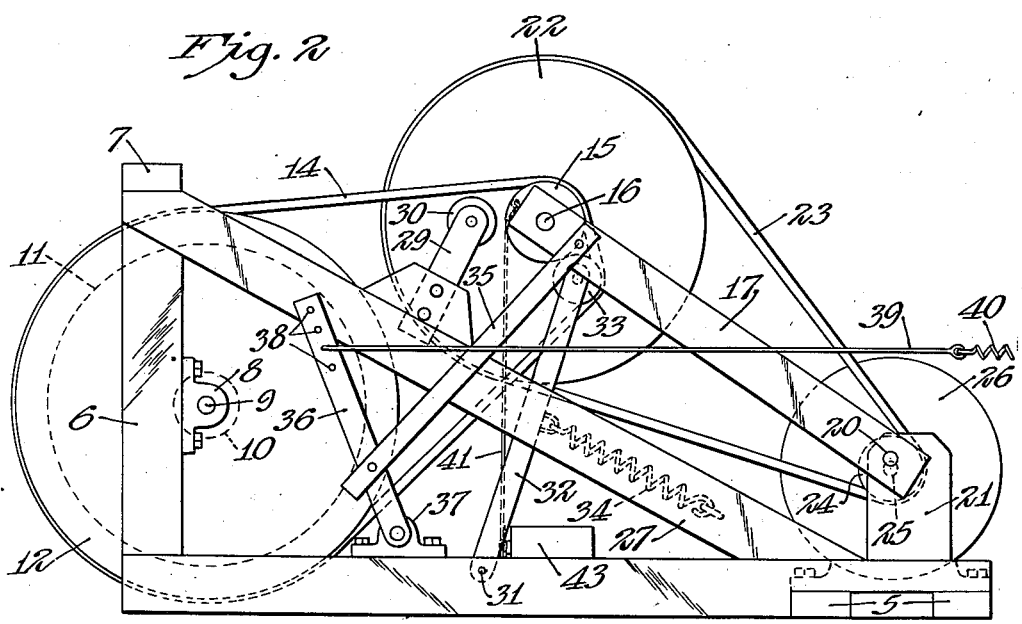

2,286,092

UNITED STATES PATENT OFFICE 2,286,092

HAY LIFT

Wilfred E. Hedlund and Martin R. Hedlund, Boyceville, Wis.

Application August 4, 1941, Serial No. 405,280

5 Claims. (Cl. 74—219)

This invention relates to hoists for hay rakes and the like.

A common method of elevating loaded hay forks into the lofts of barns is with a block and tackle arrangement wherein the rope is pulled by horses to elevate the load. Then the horses must be maneuvered to return the rope and permit the fork to be lowered to pick up another load.

It is an object of our invention to provide an electrically driven hoist adaptable for use as a hay rake hoist wherein relatively simple yet highly efficient means is provided for turning a rope winding drum in the proper direction for hoisting a load and then releasing the drum to permit it to reverse quickly and easily.

Another object of the invention is to provide means for cutting out the electric motor when the drum is released and for again starting the motor when the drum is connected for hoisting.

A further object of the invention is to provide a motor driven hoisting apparatus having a belt drive wherein a power pulley is quickly disconnected from the belt and maintained completely out of contact with the belt to halt the application of power to the winding drum and also to maintain the disconnected belt in proper alignment so that the belt and power pulley will properly re-engage when desired.

Still another object of the invention is to provide means for maintaining the various belts under proper tension.

These and other objects and advantages of the invention will more fully appear from the following description made in connection with the accompanying drawing, wherein like reference characters refer to the same parts throughout the views, and, in which:

Fig. 1 is a plan view; and

Fig. 2 is a side elevation of an embodiment of our invention.

In the drawing there is shown a frame comprising a pair of lower longitudinal side members 3 and 4, a pair of cross members 5 at one end and a pair of uprights 6 at the other end, said uprights being connected by a transverse member 7.

The frame uprights 6 carry bearings 8 which rotatably support a shaft 9, the latter forming a portion of a spool 10 having ends 11 and 12. The spool end 12 comprises a driven pulley having grooves 13 to receive a pair of V belts 14. The belts 14 also run over a relatively small double grooved pulley 15 which is mounted on a shaft 16 rotatably carried by a pair of arms 17 and 18 which extend outwardly from a substantially U-shaped yoke 19. The yoke 19 is pivotally mounted at 20 to a pair of short uprights 21 at the right-hand ends of the frame side members 3 and 4. Also mounted on the shaft 16 is a relatively large grooved pulley 22, and said pulley 22 is connected by a V belt 23 to a small pulley 24 mounted on the rotary shaft 25 of an electric motor 26.

A pair of diagonal supports 27 and 28 extend from the upper portions of the uprights 6 downwardly to the opposite ends of the frame members 3 and 4 to strengthen said uprights. The diagonal support 27 has a pair of short arms 29 extending upwardly therefrom, and to said arms is pivoted a small double grooved pulley 30. Pivotally connected to the side frame member 4 at 31 is a pair of arms 32 which carry a small double grooved pulley 33 of approximately the same size as the pulley 30. A tension spring 34 is connected between the pivoted arm 32 and the diagonal brace 27 to normally urge the pulley carrying arm 32 toward the right. Connected to the arm 17 extending outwardly from the U-shaped yoke 19 is a lever 35 which is also pivotally connected to a lever 36 which swings in a suitable bearing 37. It should be noted that the lower end of the lever 35 is provided with a pair of apertures so that the distance from the lever 36 to the arm 17 can be varied. The upper portion of the lever 36 is provided with a plurality of apertures 38 which are adapted to selectively receive an end of a rod 39 which is connected with a tension spring 40, said spring being adapted to connect with a suitable hand lever for pulling the rod 39 to the right.

The arm 18 extending outwardly from the U-shaped yoke 19 has a wire or cord 41 connected thereto, and the cord 41 extends to the control handle 42 of a circuit controller 43. While the wire is not shown it is, of course, to be understood that the switch 43 is adapted to make and break the electric circuit to the motor 26 when the yoke 19 and arms 17 and 18 are swung upwardly and downwardly.

In operation a hoisting rope is connected to the spool 10 preferably being tied to a short rod 44 at the rear end of the spool as viewed in Fig. 1. The rope is then connected to the hay rake or other device to be lifted in any approved manner. The U-shaped pivoted yoke 19, its arms 17 and 18, and pulleys 15 and 22 which are supported by said arms lie in a position which is lower than the one illustrated in Fig. 2. The yoke and pulley unit tends to drop downwardly under its own weight and is limited in its downward movement by the lever actuating rod 39. In its downward position the small power pulley 15 has passed betweeen the small pair of idler pulleys 30, 33, and the V belts 14 are supported between said idler pulleys 30, 33 and the driven pulley 12 at one end of the spool 10. Thus the small power pulley 15 is entirely out of contact with the driven belt 14 and should the motor 26 be rotating it will have no effect upon said belt 14. The idler pulley 33 which is pivoted and normally urged to the right between spring 37 will spread away from the other idler pulley 30 and the power pulley 15 as the latter is lowered. Said idler pulleys 30, 33 in addition to keeping the belt 14 out of engagement with the power pulley 15 when the latter is lowered also function to maintain the belts 14 in proper alignment so that they will fit into the grooves of the power pulley 15 when the load 39 is drawn to the right and the levers 35 and 36 raise the arms 17 and 18 and the yoke 19.

The position of Fig. 2 is an intermediate position, and when the power pulley 15 is raised a little more the idler pulley 33 will swing closer to the idler pulley 30, the belt is out of contact with the idler 30 but the idler 33 will remain in contact with the belt and serve as a belt tightener.

When the yoke 19 is swung up it pulls the cord 41 to close the switch 43 and energize the motor 26. This drives the large power pulley 22 which also drives the power pulley 15, and of course, the driven pulley 12 is rotated through its V belt connection with said power pulley 15.

When a load such as a rake full of hay has been raised and conveyed to a point over the hay loft it is then necessary to drop it so that it can be unloaded. This, of course, involves a reversal of the drum or spool 10 and that is accomplished by permitting the rod 39 to move to the left so that the power pulleys 15 and 22 can drop downwardly. This suddenly disengages the power pulley 15 from the belt 14 and even though the motor is cut off by actuation of the switch 43 it is still rotating but this continued rotation has no effect upon the belts 14 and driven pulley 12 which can immediately reverse under the weight of the loaded hay fork.

Attention is called to the fact that the yoke 19 has its pivot point 20 disposed slightly above the axis of the motor shaft 25. Therefore, when the yoke 19 is raised to energize the motor 26 and rotate the entire group of pulleys and winding drum, the V belt 23 connecting the motor pulley 24 and the large power pulley 22 will be tightened more than when the yoke 19 is lowered and the motor and power pulley 22 are idling to a stop.

It will, of course, be understood that various changes may be made in the form, details, arrangement and proportions of the various parts without departing from the scope of our invention.

What is claimed is:

1. A hoist for hay rakes and the like comprising, a winding drum, a rotary power device including a pulley, a driven pulley connected to said winding drum, a belt connecting said power pulley to said driven pulley, means for shifting said power pulley toward said driven pulley, and a pair of pulleys adjacent said power pulley at opposite sides thereof to receive said belt when said power pulley is shifted toward said driven pulley and to maintain said belt in alignment and out of contact with said power pulley when the latter is shifted toward said driven pulley.

2. The structure in claim 1 and one of said pair of pulleys being yieldably movable away from said driven pulley to maintain tension upon said belt when said power pulley is shifted toward said driven pulley and said belt is supported by said pair of pulleys to assist in maintaining said belt in proper alignment with said power pulley when out of contact with the same.

3. The structure in claim 1 and one of said pair of pulleys being movably and yieldably urged away from said driven pulley to maintain said belt under tension when said power pulley is shifted toward said driven pulley, and said movable pulley being maintained in engagement with said belt when said power pulley is shifted away from said driven pulley and into driving contact with said belt and the other of said pair of pulleys being out of engagement with said belt when said power pulley is shifted away from said driven pulley and into contact with said belt.

4. A hoist for hay rakes and the like comprising, a winding drum, a rotary power device including a pulley, a driven pulley connected to said winding drum, a belt connecting said power pulley to said driven pulley, means for shifting said power pulley toward said driven pulley, means for receiving said belt when said power pulley is shifted toward said driven pulley to maintain said belt out of contact with said power pulley and to maintain said belt in proper alignment for engagement with said power pulley when said power pulley is shifted away from said driven pulley.

5. A hoist for hay rakes and the like comprising, a winding drum, a motor having a drive shaft with a pulley thereon, a power pulley of large diameter drivingly connected to said pulley on said motor shaft, a relatively smaller pulley connected to and driven by said large pulley, a driven pulley connected to said winding drum, a belt connecting said driven pulley and said smaller pulley, means for shifting said smaller pulley toward said driven pulley, a pair of pulleys adjacent said smaller pulley and in spaced relation to permit said smaller pulley to pass between said pair of pulleys when shifted toward said driven pulley, said pair of pulleys being positioned to receive said belt when said smaller pulley is shifted toward said driven pulley to maintain said belt out of contact with said smaller pulley when so shifted and also to maintain said belt in proper alignment for contacting of said belt with said smaller pulley when the latter is shifted away from said driven pulley.

WILFRED E. HEDLUND.
MARTIN R. HEDLUND.